United States Patent [19]
Bohaychuk et al.

[11] Patent Number: 6,105,614
[45] Date of Patent: Aug. 22, 2000

[54] CHOKE VALVE FOR THROTTLING FLUID FLOW

[75] Inventors: Larry J. Bohaychuk, Mundare; Harry Richard Cove, Edmonton, both of Canada

[73] Assignee: Masterflo Valve, Inc., Edmonton, Canada

[21] Appl. No.: 09/334,123

[22] Filed: Jun. 15, 1999

[51] Int. Cl.[7] .................................................. F16K 47/14

[52] U.S. Cl. ........................................ 137/625.3; 251/118

[58] Field of Search ............................ 137/625.3, 625.33; 251/118

[56] References Cited

U.S. PATENT DOCUMENTS

| | | | |
|---|---|---|---|
| 4,540,022 | 9/1985 | Cove | 137/625.3 |
| 4,569,370 | 2/1986 | Witt | 137/625.3 |
| 5,018,703 | 5/1991 | Goode | 251/127 |

Primary Examiner—John Fox
Attorney, Agent, or Firm—Sheridan Ross P.C.

[57] ABSTRACT

In a choke valve having a cage with external sleeve flow trim, the large ports of the cage are aligned with the axis of the inlet bore and a deflection bar is positioned at the top end of the main bore, opposite to the inlet bore. The flow patterns within the choke are consequently altered with significant reduction of localized erosional wear areas.

1 Claim, 7 Drawing Sheets

CHOKE VALVE FOR THROTTLING FLUID FLOW

FIELD OF THE INVENTION

The present invention relates to a choke valve for controlling fluid flow in a line.

BACKGROUND OF THE INVENTION

A choke valve is a throttling device used to reduce the fluid pressure or flow rate in a flow line. (Hereinafter the device is referred to as a "choke".) Chokes are commonly used in connection with well drilling and production operations for producing oil or gas, although they have other applications as well.

In many cases, the stream passing through the choke is very erosive. For example, a choke used in a drilling or production operation may be exposed to a high pressure gas stream moving at high velocity and carrying sand particles. In the course of undergoing pressure reduction in passing through the choke, the velocity of the flow stream is increased. This exacerbates the erosional effect of the flow stream. Choke failure due to erosion can lead to very serious problems in controlling well flow or, as a minimum, leads to costly repairs.

As a result of these factors, designers of chokes go to great lengths in trying to improve the durability of their products. The present invention is concerned with a combination of design features which, when implemented, yielded surprisingly beneficial durability improvements in a type of known choke commonly referred to as having a "cage with external sleeve flow trim".

In general, such a choke comprises:

a valve body and a flow trim;

the valve body having an axial main bore or cavity extending part way through the body, an inlet bore connecting with the inner end of the main bore from the side, and an outlet bore extending to one end of the body from the main bore. The three bores form a generally T-shaped bore network wherein the main bore contains the valve components;

the inlet and outlet passages into the main bore may take various configurations to provide appropriate flow line interface; and the flow trim, comprising a cage and external throttling sleeve, being positioned in the main bore at the junction of the bores. The cage is a stationary tubular member which extends transversely over the inner end of the inlet bore. The cage typically has two pairs of ports, arranged in opposed relationship, extending through its side wall. The ports of one pair are larger than those of the other pair. The flow stream may move through the inlet bore, enter the cage through the ports and leave through the outlet bore. An annular passageway is formed between the body and the cage so that fluid entering from the inlet bore may circulate through the passageway to reach the various ports. The tubular throttling sleeve is configured to closely fit over the cage and it can be advanced axially to slide across the ports and throttle or close them as required.

There are, of course, additional necessary components, such as means for advancing or withdrawing the throttling sleeve and means for closing and sealing the main bore, but they are not involved in the present invention and will not be described in detail herein.

In summary therefore, the choke design of interest utilizes a stationary cage coupled with a sliding external sleeve to control the flow area (the ports). The choke is designed so that the stream entering through the inlet bore travels into the cage through the annular passageway and the throttled ports; it then leaves through the outlet bore.

There are a number of chokes available commercially which utilize the aforementioned flow trim design. U.S. Pat. No. 4,540,022 ("'022") discloses one such choke having a flow trim comprising a cage and external sleeve. This patent is assigned to the assignee of the present application. The present invention was developed in the course of a research effort to extend or improve the durability of this choke.

It needs to be noted that the '022 choke, in its commercially offered form, has always had the ports offset 45° from the axis of the inlet bore.

It further needs to be understood that, in some models of the choke of interest, an internal sleeve (referred to as a retainer) is provided, contiguous to the main bore surface. This retainer acts to lock the cage in place. For purposes of the claims of this application, the retainer is to be considered to be simply an extension of the body. So when the term "body" is used in the claims, it is intended to describe both a body without an internal retainer or one equipped with a retainer.

SUMMARY OF THE INVENTION

In accordance with the invention, a choke valve having a cage with external sleeve flow trim is provided with the following combination of features:

(1) One pair of ports is aligned with the axis of the inlet bore; and (2) A protuberance, referred to as a deflection bar, extends downwardly and inwardly from the body into the main bore in alignment with its axis and located about 180° from the axis of the inlet bore. Otherwise stated, the bar is located at the top of the main bore, in line with the axis of the inlet bore. The deflection bar preferably having angled side surfaces for deflecting the circularly flowing streams moving through the semi-circular branches of the annular passageway, whereby they converge together angularly instead of head on.

By modifying the choke in this way, localized erosion, arising at several areas of the steel surfaces containing the flow, has been significantly reduced.

Broadly stated, the invention is an improvement in a choke valve comprising a body having first and second ends, the body having an internal surface forming a main bore extending axially part of the way therethrough from its first end, an inlet bore connecting with the main bore and an outlet bore connecting axially with the main bore, the main bore containing a flow trim comprising a tubular stationary cage extending transversely of the inlet bore and forming opposed ports in its side wall, the surface of the main bore combining with the cage to form an annular passageway having semi-circular sections so that fluid may flow from the inlet bore, through the passageway sections and ports and out the outlet bore, the flow trim further comprising a tubular sleeve operative to slide over the cage from its first end to throttle the ports and means for actuating the sleeve and sealing the first end of the main bore. The improvement comprises: one pair of ports being aligned with the inlet bore; and a protrusion extending inwardly into the main bore from the main bore surface and being located in opposed relationship to the inlet bore, so that fluid streams moving through the sections of the annular passageway is deflected inwardly by the protrusion.

DESCRIPTION OF THE PREFERRED EMBODIMENT

A series of bench tests were carried out to study the erosional effects of pumping a pressurized stream of water, carrying entrained sand, through a choke 1, shown in FIGS. 1–6.

The choke 1 comprised a body 2 forming a main bore 3, inlet bore 4 and outlet bore 5. A flow trim 6, comprising a stationary cage 7 and throttling sleeve 8, was positioned in the main bore 3. The cage 7 had a pair of opposed large ports 9 and a pair of opposed small ports 10. The two pairs of ports were offset at 90° from each other. A retainer 11 locked the cage 7 in position. A stem assembly 12 was provided in the main bore 3 for advancing and retracting the sleeve 8 as required to throttle the ports 9, 10. A suitable seal assembly 13 completed the componentry of the known choke 1. The choke 1 had its ports 9, 10 offset at 45° relative to the axis 14 of the inlet bore 4, in accordance with the commercially offered design.

Water was pumped through the choke 1 at 123 gpm with a pressure drop of 850 psi. The water contained 1% sand by mass.

The mixture was pumped through the choke to assess wear rate, material loss and performance. Inspections were carried out after each 4 hour interval of pumping.

Figure 1:
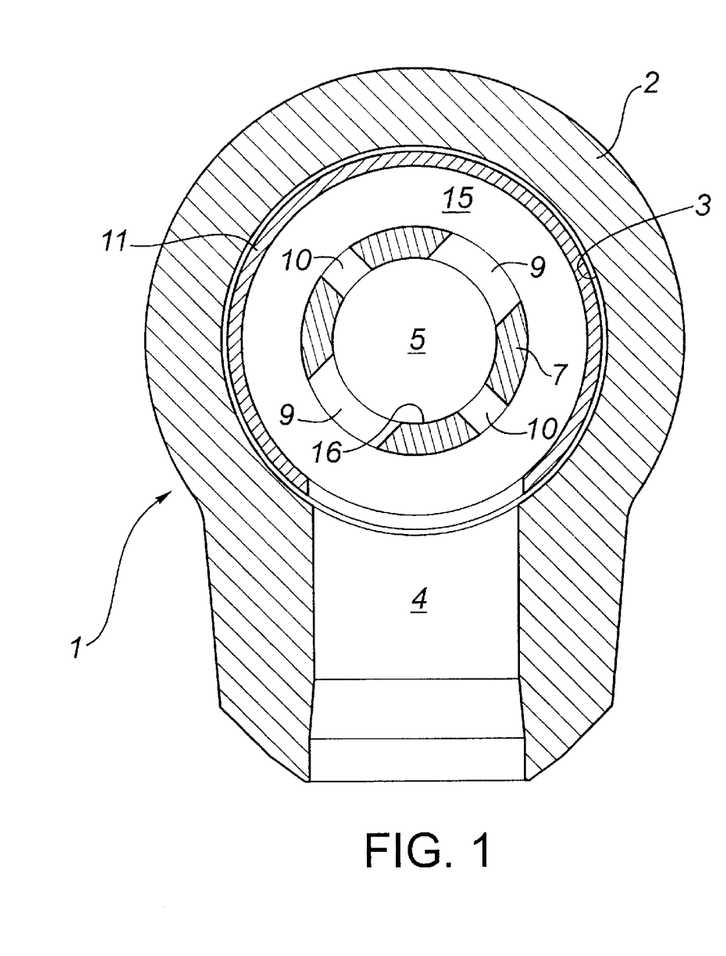
FIG. 1 is a simplified, cross-sectional end view of a choke body, retainer and cage showing the ports offset angularly relative to the axis of the inlet bore, in accordance with the commercial version of the '022 prior art choke, which was the embodiment used in the initial tests described.
Figure 2:
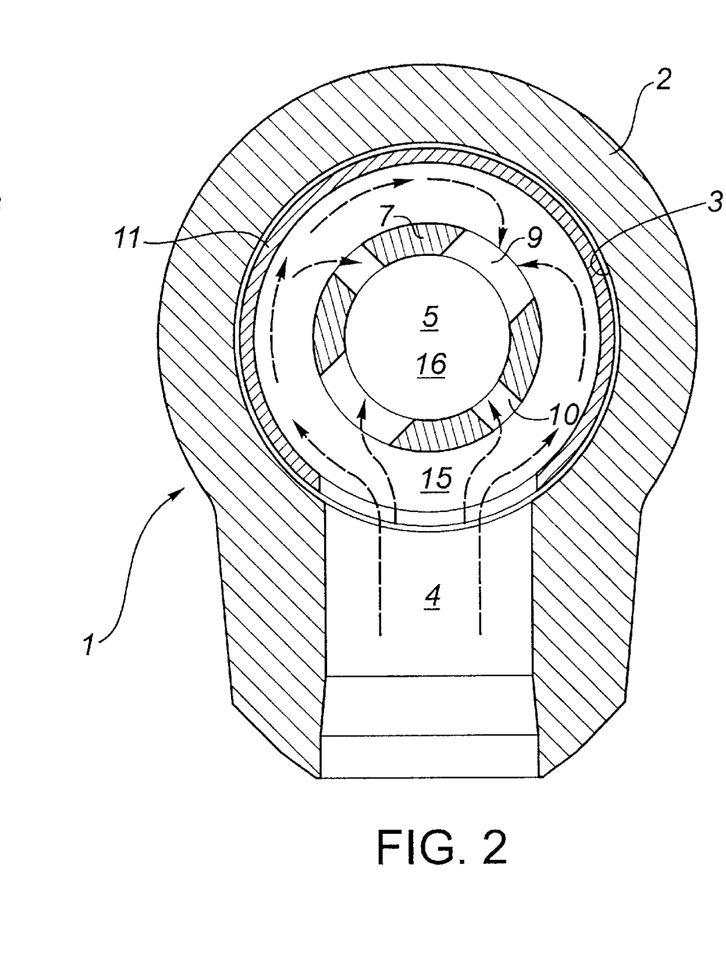
FIG. 2 is a view similar to FIG. 1, with arrows fancifully indicating the main flow moving through the annular passage to the ports.
Figure 3:
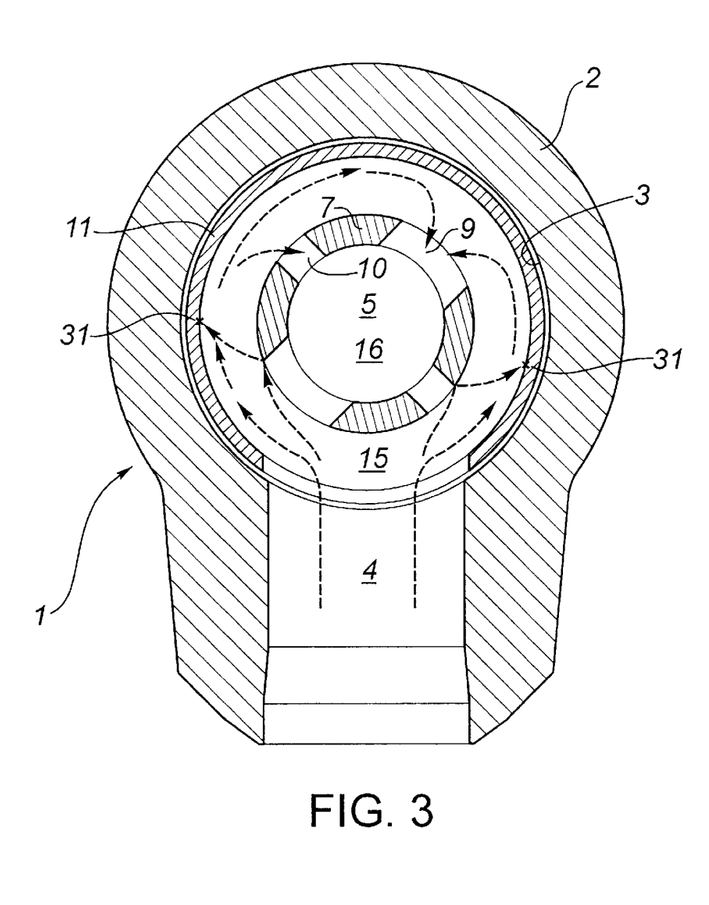
FIG. 3 is a view similar to FIG. 1 with arrows fancifully indicating the main flow pattern and bold arrows indicating deflected fluid which impinges against the retainer to cause localized erosion in areas identified by x's.
Figure 4:
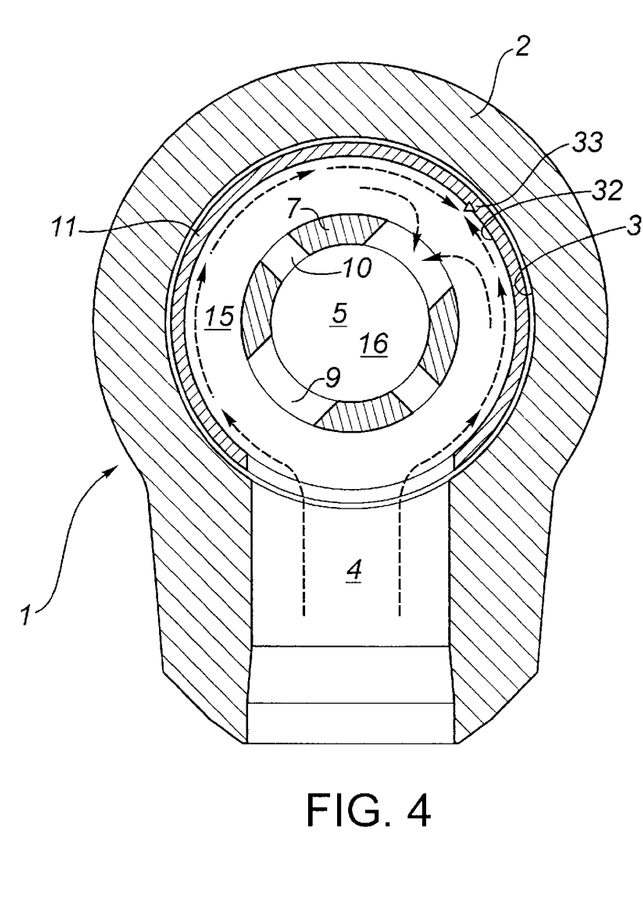
FIG. 4 is a view similar to FIG. 1 with arrows fancifully indicating the circular flows of fluid moving through the semi-circular sections of the annular passageway. The head-on collision of these flows causes localized erosion in the area identified by a Δ.
Figure 5:
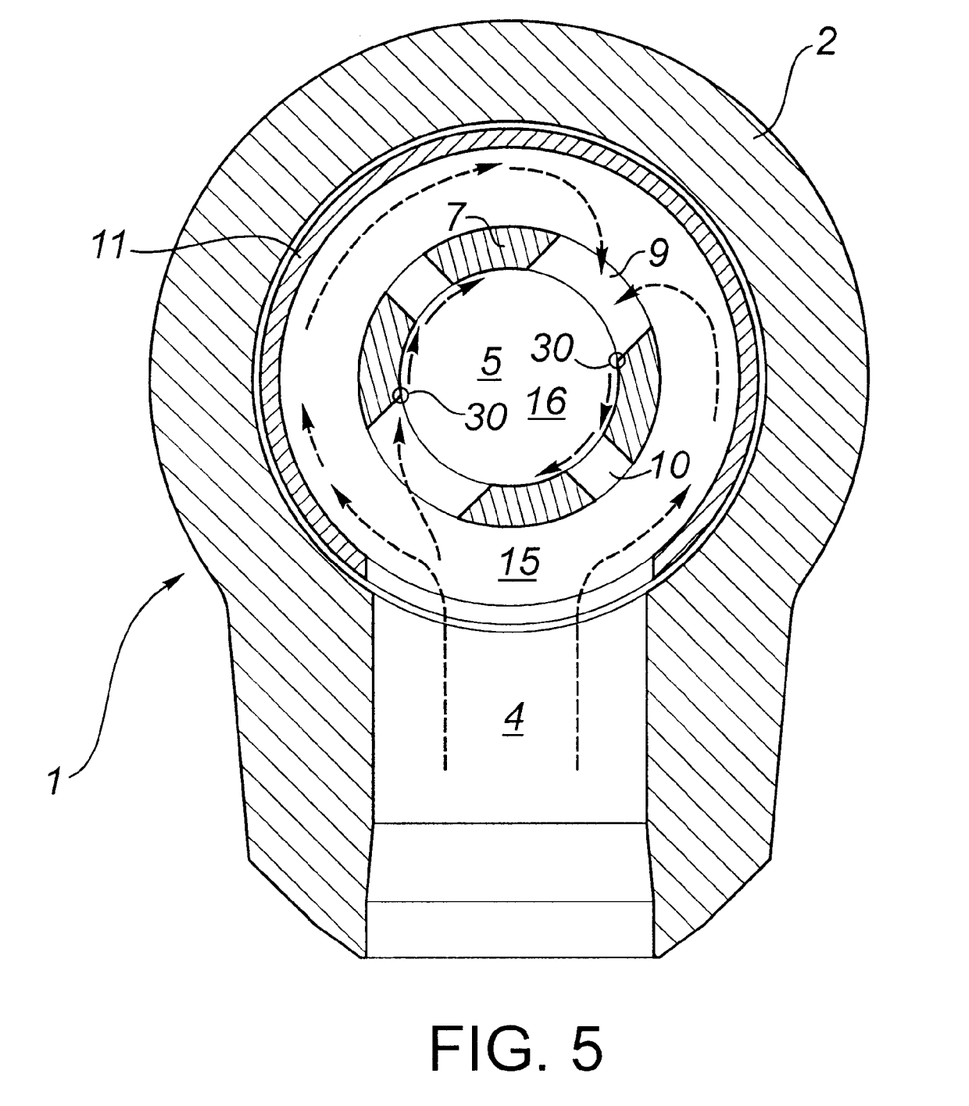
FIG. 5 is a view similar to FIG. 1 with arrows fancifully indicating the circular flows moving both through the sections of the annular passageway and internally of the cage. These flows cause localized erosion in areas identified by O's.
Figure 6:
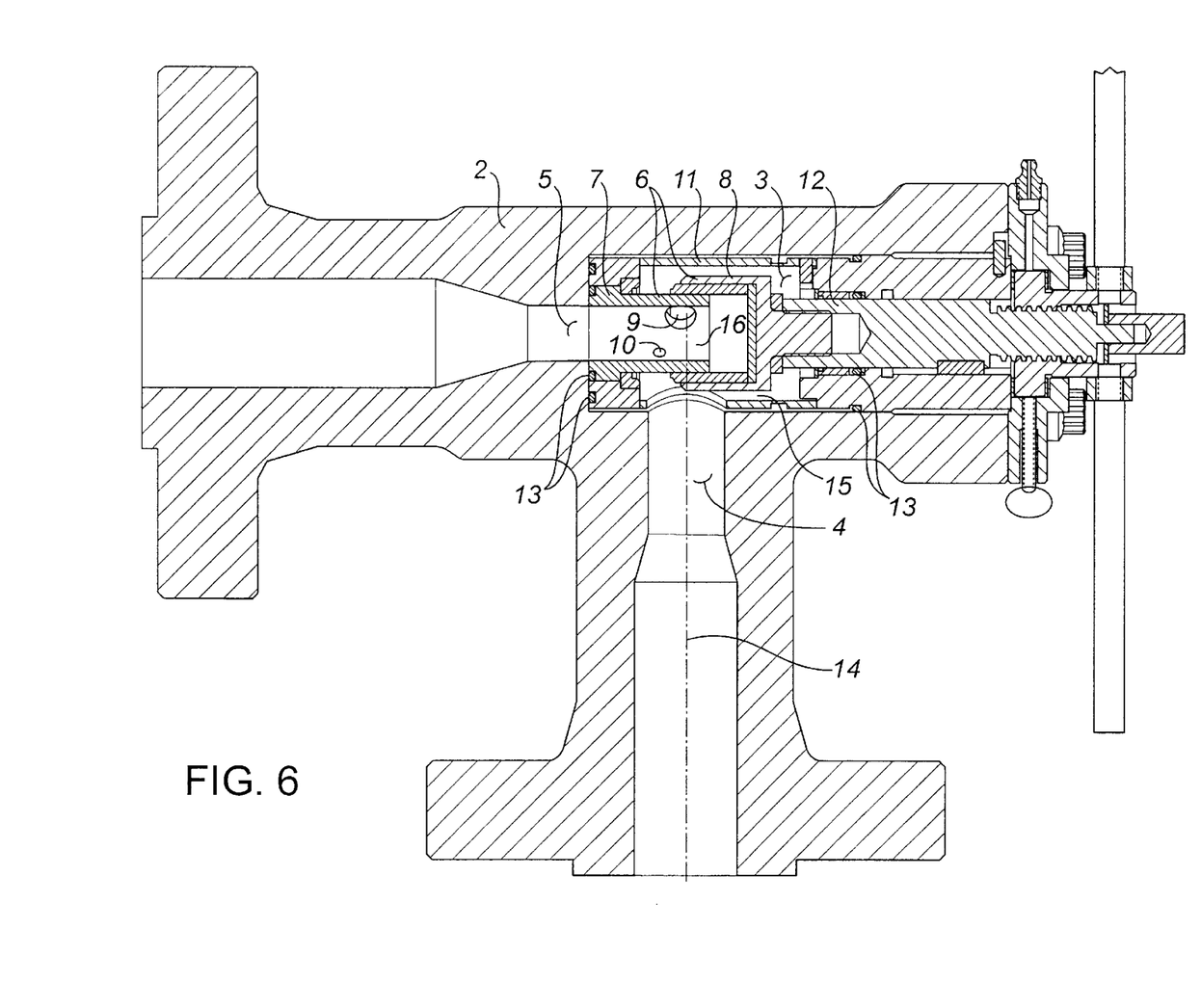
FIG. 6 is a cross-sectional side view of a complete choke having its ports offset as in the preceding Figures, showing areas identified where localized erosion arises due to the swirling and collision of flow of the fluid.

It was deduced, mainly as a result of examining wear patterns and weight loss, that the bulk of the water/sand mixture passed through the choke was substantially in accordance with the arrows shown in FIGS. 3, 4 and 5. As shown in FIG. 2, the stream would enter through the inlet bore 4, divide and move circularly around the cage 7 through the annular passageway 15, enter the cage bore 16 through the bores 9, 10 and swirl and advance out through the cage bore and outlet bore 5.

It was determined that localized wear occurred at the far corners 30 (see FIG. 5) of the cage port 9 and at an impingement area 31 (see FIG. 3), on the inner surface of the retainer 11. It was assumed from this wear that fluid was striking the corners 30 and being deflected at the area 31 to cause erosion. This flow pattern is indicated by the bold arrows on FIG. 3.

It was further determined that localized wear of the main bore surface 32 occurred in the area 33, identified by Δ's. It was conjectured that the circular fluid flows moving through the two sections of the annular passageway 15 would collide head on at the far side of the cage 7, thereby generating eddy currents which caused localized erosion at area 33 (see FIG. 4).

It was further determined that erosional wear occurred along the surface 50 of the cage bore 16, the exposed surface 51 of the sleeve 8 and the surface 52 of the outlet bore 5. It was conjectured that, when flow entered the cage bore 16 through the offset ports 9, 10, it was caused to swirl, as indicated by the bolded arrows in FIG. 5. It was assumed that the wear of the aforementioned surfaces 50, 51 and 52 was caused by the swirling flow pattern arising from the offset positioning of the ports 9, 10.

Several tests were then conducted with the large ports 9 aligned with the axis 14 of the inlet bore 4. It was found that, with this change, the wear at the impingement area 31, outer port corners 30, and along surfaces 50, 51 and 52, was greatly reduced.

However the eddy current erosion at area 33 persisted.

A second change was then initiated. A deflection bar 40, having inwardly slanted side surfaces 41 was attached to the body 2 at the top of the main bore surface 32, in alignment with the axis 14 of the inlet bore (see FIG. 7).

Figure 7:
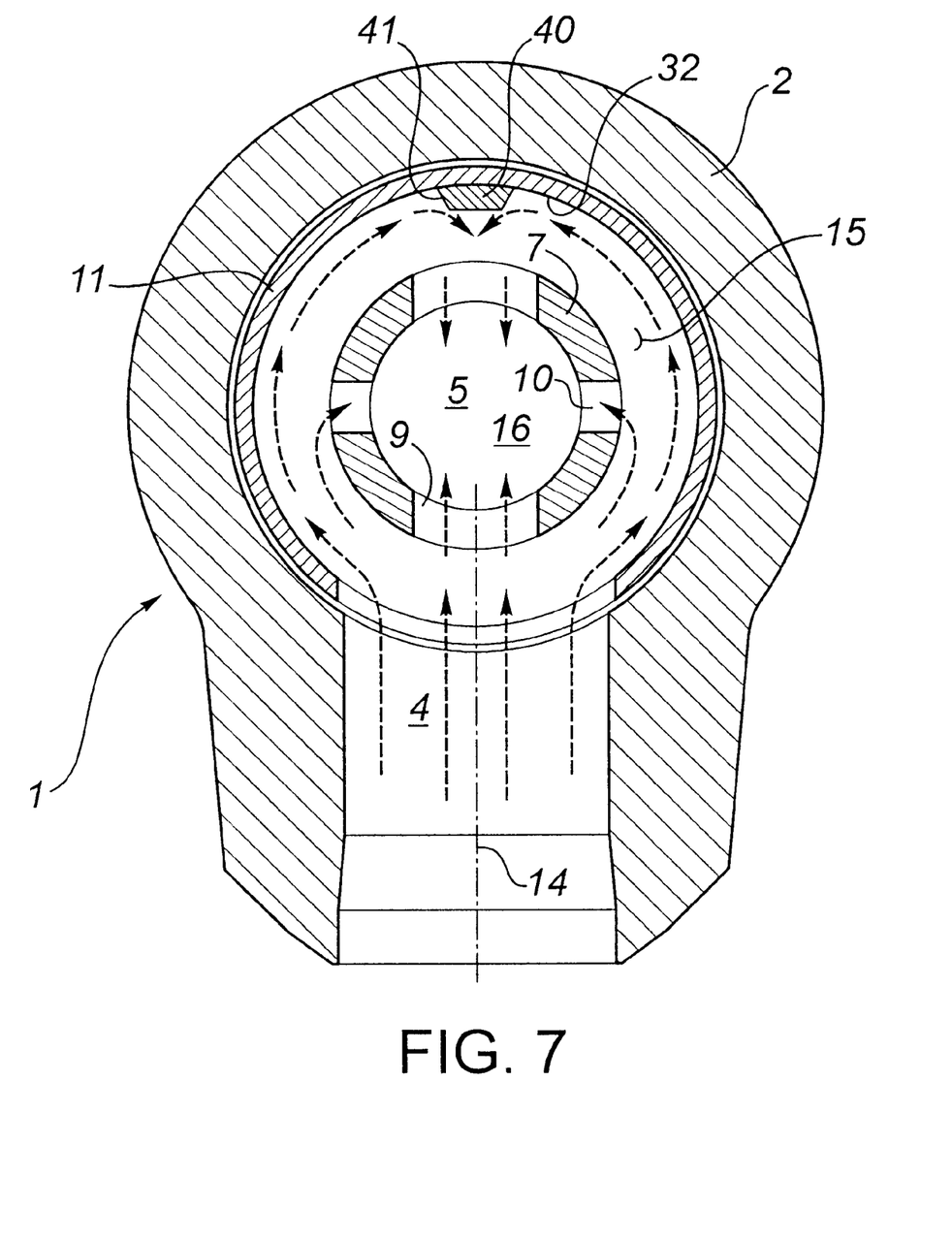
FIG. 7 is a simplified, cross-sectional end view of a choke body, retainer and cage with one pair of ports (normally the larger pair) aligned with the inlet bore axis and a deflection bar in position opposite to the inlet bore. Arrows fancifully indicate the nature of the flow streams.
Figure 8:
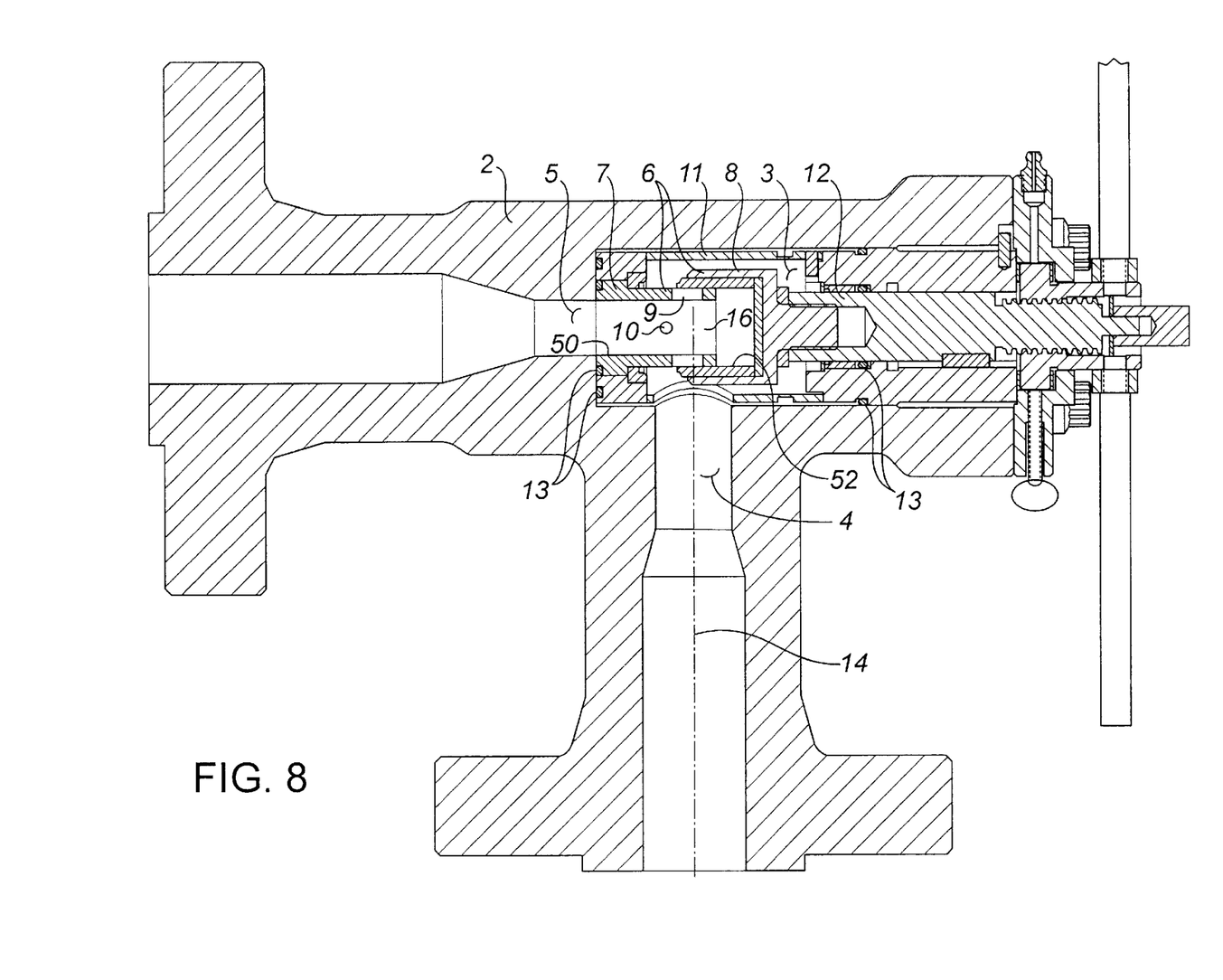
FIG. 8 is a cross-sectional side view of a complete choke in accordance with the invention, having its major ports aligned with the axis of the inlet bore and a deflection bar in place.
Figure 9:
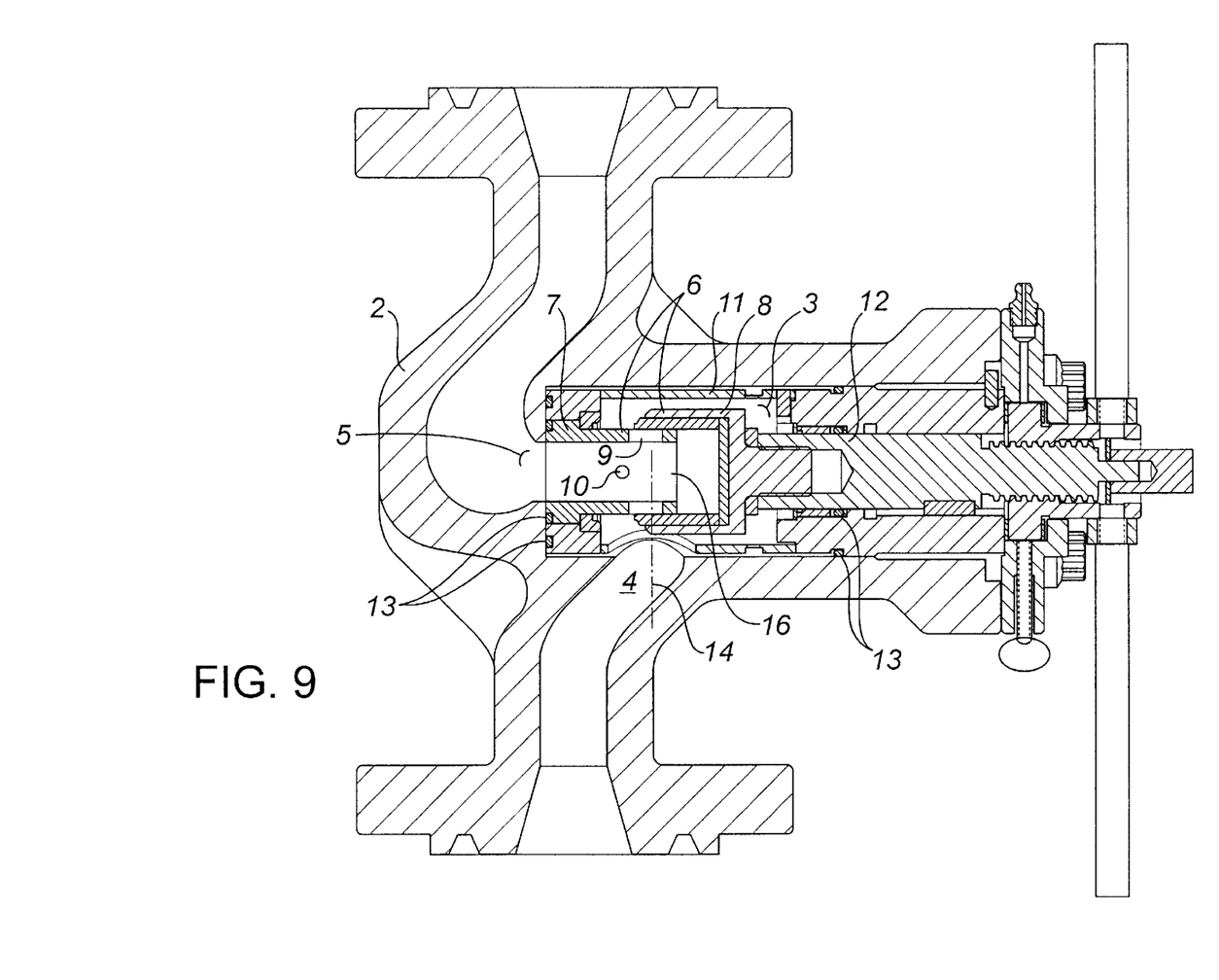
FIG. 9 is a cross-sectional side view of a complete choke having an alternative bore arrangement, incorporating the invention.

Further tests were then carried out using the two modifications in combination. The choke 1 was configured as shown in FIGS. 7 and 8. It was found that the choke functioned with minimal erosional wear at the areas and port corners where wear had previously occurred.

It is believed that the deflection bar 40 deflects the semi-circular flows in the annular passageway 15 and minimizes the production of destructive eddy currents.

The combination of providing the deflection bar 40 at the position stated and aligning the large ports 9 with the axis 14 of the inlet bore 4 greatly reduced localized impingement and eddy current erosion as well as the more spread out swirl erosion. Choke life has been at least doubled by making these modifications.

The embodiments of the invention in which an exclusive property or privilege is claimed are defined as follows:

1. In a choke valve comprising a body having first and second ends, the body having an internal surface forming a main bore extending axially part of the way therethrough from its first end, and inlet and outlet bores connecting with the main bore, the main bore containing a flow trim comprising a tubular stationary cage extending transversely of the inlet bore and forming opposed ports in its side wall, the surface of the main bore combining with the cage to form an annular passageway having semi-circular sections, so that fluid may flow from the inlet bore, through the passageway sections and ports and out the outlet bore, the flow trim further comprising a tubular sleeve operative to slide over the cage from its first end to throttle the ports and means for actuating the sleeve and sealing the first end of the main bore, the improvement comprising:

one pair of ports being aligned with the inlet bore; and a protrusion extending inwardly into the main bore from the main bore surface and being located in opposed relationship to the inlet bore, so that fluid streams moving through the sections of the annular passageway are deflected inwardly by the protrusion.

* * * * *